United States Patent [19]

Holmes et al.

[11] Patent Number: 5,752,675
[45] Date of Patent: May 19, 1998

[54] THRUSTER CONTROL OF YAW WITHOUT YAW MEASUREMENTS

[75] Inventors: Thomas Joseph Holmes, Portola Valley; Peter Timothy Gauthier; John S. Higham, both of Mountain View, all of Calif.

[73] Assignee: Space Systems/Loral, Inc., Palo Alto, Calif.

[21] Appl. No.: 498,657

[22] Filed: Jul. 3, 1995

[51] Int. Cl.$^6$ .............. B64G 1/32; B64G 1/36; B64G 1/38
[52] U.S. Cl. ............... 244/168; 244/170; 244/166
[58] Field of Search .................... 244/164, 165, 244/168, 170, 176, 194, 195, 166; 364/434, 424.023, 459

[56] References Cited

U.S. PATENT DOCUMENTS

| | | | |
|---|---|---|---|
| 4,521,855 | 6/1985 | Lehner et al. | 244/364 |
| 4,537,375 | 8/1985 | Chan | 244/164 |
| 4,567,564 | 1/1986 | Bittner et al. | 244/164 |
| 4,848,706 | 7/1989 | Garg et al. | 244/169 |
| 4,931,942 | 6/1990 | Garg et al. | 244/164 |
| 5,149,022 | 9/1992 | Flament | 244/165 |
| 5,205,518 | 4/1993 | Stetson, Jr. | 244/165 |
| 5,308,024 | 5/1994 | Stetson, Jr. | 244/165 |
| 5,343,398 | 8/1994 | Goodzeit et al. | 244/164 |
| 5,349,532 | 9/1994 | Tilley et al. | 244/164 |
| 5,452,869 | 9/1995 | Basuthakur et al. | 244/164 |

FOREIGN PATENT DOCUMENTS 0 460 935 A2  12/1991  European Pat. Off.

*Primary Examiner*—Virna L. Mojica
*Attorney, Agent, or Firm*—Perman & Green, LLP

[57] ABSTRACT

An automatic, on-board system for orbiting spacecraft that controls yaw excursions caused by solar torques and thruster firings, which system combines inputs indicative of roll and yaw momentum increases and inputs containing information comprising the unbiased roll error from the earth sensor, yaw momentum measured from the wheel speeds, and commanded yaw momentum output from the wheel controller, and produces therefrom output signals indicative of the yaw estimate and the yaw momentum estimate. These output signals are combined and processed in a controller with a mimimum yaw error and roll thrust yaw controller gain and a miminmum yaw error and roll thrust yaw momentum controller gain, and a signal is produced therefrom for commanding roll thruster firings to change roll momentum, and, in turn, control yaw attitude and yaw excursions.

17 Claims, 2 Drawing Sheets

THE BASIC TOPOLOGY OF THE THRUSTER LTMM IS:

*WHEN AVAILABLE $$\begin{bmatrix} \dot{\phi} \\ \dot{\psi} \\ \dot{H}_x \\ \dot{H}_z \\ \dot{h}_z \\ \Delta \dot{h}_{zc} \\ \dot{\psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & \Gamma_x & \omega_0 & 0 & 0 & 0 \\ 0 & 0 & \Gamma_z & \omega_0 & 0 & 0 & 0 \\ 0 & 0 & 0 & 0 & \frac{1}{\tau} & -\frac{1}{\tau} & 0 \\ 0 & 0 & 0 & 0 & -\frac{1}{\tau} & \frac{1}{\tau} & 0 \\ 0 & 0 & 0 & 0 & 0 & 0 & 0 \end{bmatrix} \begin{bmatrix} \phi \\ \psi \\ H_x \\ H_z \\ h_z \\ \Delta h_{zc} \\ \dot{\psi}_{bias} \end{bmatrix} + \begin{bmatrix} 0 & 0 & 0 \\ 0 & 0 & 0 \\ 1 & 0 & 0 \\ 0 & 1 & 0 \\ 0 & 0 & -\frac{1}{\tau} \\ 0 & 0 & \frac{1}{\tau} \\ 0 & 0 & 0 \end{bmatrix} \begin{bmatrix} T_x \\ T_z \\ h_{zc} \end{bmatrix}$$

$$+ [L] \begin{bmatrix} \phi_{ES} - \hat{\phi} \\ h_{z\,tach} - \hat{h}_z \\ \dot{\psi}_{DIRA} - \hat{\dot{\psi}}_{bias} - \hat{\dot{\psi}} \end{bmatrix}$$

$$L = \begin{bmatrix} L_{11} & 0 & 0 \\ L_{21} & 0 & L_{23} \\ L_{31} & 0 & L_{33} \\ L_{41} & 0 & L_{43} \\ 0 & L_{52} & 0 \\ 0 & L_{62} & 0 \\ L_{71} & 0 & L_{73} \end{bmatrix}$$

$$g_x = -3\omega_0^2 (I_y - I_z) \; ; \; \Gamma_x = \frac{h_n + \omega_0 (I_y - I_x)}{I_x} \; ; \; T_x = 16\bar{H}_x$$

$$\Gamma_z = -\frac{h_n + \omega_0 (I_y - I_z)}{I_z} \; ; \; \hat{\dot{\psi}} = -\frac{\hat{H}_z}{I_z} - \omega_0 \hat{\phi} \; ; \; T_z = 16\bar{H}_z$$

FIG. 2

THRUSTER CONTROL OF YAW WITHOUT YAW MEASUREMENTS

BACKGROUND OF THE INVENTION

Field of the Invention

The present invention relates to the control of orbiting spacecraft and more particularly to a method and means for controlling spacecraft yaw excursions caused by solar torques and thruster firings.

Problem to be Solved

Earth-orbiting spacecraft, such as communications satellites, require orientation control to minimize excessive movements in pitch, yaw, and roll, that can effect their remaining in proper orbit, and that can interfere with their pointing in a proper direction to insure the reception of signals transmitted therefrom at receiving stations on the ground. Various systems are provided on the spacecraft to affect this control involving momentum wheels, thrusters, magnetic torquers, and sensors for yaw, roll, and pitch. For example, one such control system uses momentum bias for preventing the set yaw orientation from drifting. However, the spacecraft is regularly undergoing disturbances, from such factors as solar torques and thruster firings, that can cause variations in the yaw angle from the desired orientation and beyond allowable ranges of operation. The current approach to dealing with this problem uses a combination of the yaw sensors and magnetic torquers to maintain the desired yaw orientation. However, this approach is limited during activities such as thruster unloads and stationkeeping maneuvers when yaw is not being estimated or measured, thus adversely impacting pointing accuracy and ground operator monitoring time.

It would therefore be desirable to have a system for controlling spacecraft orientation that does not rely on the yaw sensors or require magnetic torquers and which can remain functioning during thruster unloads and continue to estimate yaw through stationkeeping maneuvers.

Objects

It is accordingly an object of the present invention to provide an automatic, on-board solution to spacecraft yaw excursions caused by solar torques and thruster firings.

It is also an object of the invention to provide a method and means for spacecraft orientation control that will increase pointing accuracy and reduce ground operator burden.

It is another object of the invention to provide a system for controlling spacecraft yaw without magnetic torquers or yaw sensors but which can use yaw sensor data when it is available.

It is a further object of the invention to provide a system for controlling spacecraft yaw that can remain functioning during thruster unloads, that can continue estimating yaw through stationkeeping maneuvers, and which allows momentum wheels to run at slower speeds without compromising pointing.

SUMMARY OF THE INVENTION

The present invention involves the provision of an automatic, on-board system for orbiting spacecraft that controls yaw excursions caused by solar torques and thruster firings. This system for thruster long term momentum management (TLTMM) utilizes observer and controller components which combine data indicative of roll and yaw momentum increases due to solar torques or thruster firings, and inputs from sources on the spacecraft relating to roll error from the earth sensor, wheel speeds from the wheel tachometer, effects of roll thruster and yaw thruster firings, commanded wheel momentum, and, when available, yaw rates. The gains of the TLTMM controller are a function of wheel speeds and when combined with the observer output of the yaw estimate and the deadband estimate of spacecraft yaw momentum, which are derived from the combined data, are used to control roll firings which, in turn, controls yaw attitude.

BRIEF DESCRIPTION OF THE DRAWINGS

FIG. 2 illustrates the operating matrix model for the Observer component shown in FIG. 1.

DETAILED DESCRIPTION OF THE PREFERRED EMBODIMENT

In Earth-orbiting spacecraft, such as communications satellites, on-board systems, that are monitored and commanded by ground observers, are provided for controlling the craft's orientation in pitch, roll, and yaw, about respective y, x, and z axes. These on-board systems maintain the craft in proper orbit and point it in a desired direction to maximize the reception of signals transmitted therefrom to earth-based receiving stations. A typical system includes orientation sensing components and means for adjusting the orientation of the craft including magnetic torquers, momentum wheels, and thrusters, which alter and unload unwanted momentum resulting from imposed forces from solar torque, thruster firing, fuel shift, and such.

The present invention is directed to such a system for thruster long term momentum management (TLTMM) which is automatic and located on-board the orbiting spacecraft for controlling yaw excursions caused by solar torques and thruster firings. This system for thruster long term momentum management (TLTMM) utilizes observer and controller components, the former of which combines data indicative of roll and yaw momentum increases due to solar torques or thruster firings, and inputs from sources on the spacecraft relating to roll error from the earth sensor, wheel speeds from the wheel tachometer, effects of roll thruster and yaw thruster firings, commanded wheel momentum, and, when available, yaw rates from the Digital Integrating Rate Assembly (DIRA), to provide yaw estimate and yaw momentum estimate data to the controller. The gains, i.e., mimimum yaw error and roll thrust yaw gain and minimum yaw error and roll thrust yaw momentum gain, of the TLTMM controller are a function of wheel speeds and when combined with the observer output of the yaw estimate and the deadband estimate of yaw momentum, derived from the combined data, are used to command roll firings to change roll momentum, which, in turn, controls yaw attitude.

Figure 1:
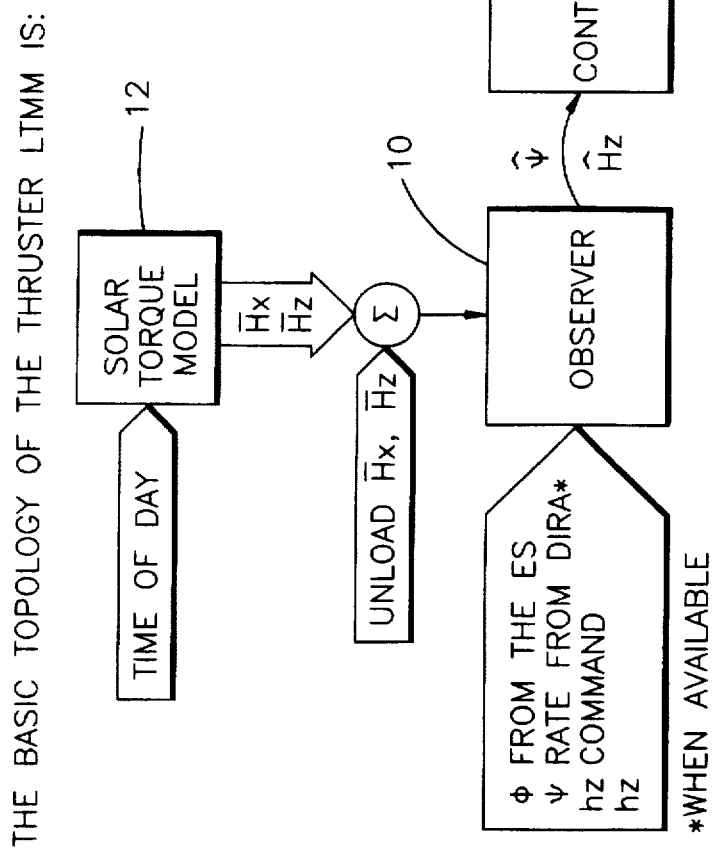
FIG. 1 illustrates the basic topology of a thruster long term momentum management (TLTMM) control system in accordance with the present invention.

More particularly, FIG. 1 illustrates the basic topology of a thruster long term momentum management (TLTMM) control system in accordance with the present invention. An Observer component 10 receives an input, from a solar torque model 12, indicative of roll and yaw momentum increases, $\vec{H}_x$ an $\vec{H}_z$, due to solar torques or thruster firings, as well as inputs with information on the unbiased roll error, Φ, from the earth sensor, yaw momentum, hz, measured from the wheel speeds, commanded yaw momentum, hz command, output from the wheel controller, and yaw rate, $\dot{\Psi}$ rate, from the DIRA when available. The Observer 10 processes the input data and outputs a yaw estimate $\hat{\psi}$ and a yaw momentum estimate $\hat{H}_z$ to a Controller component 14 which produces a commanded change in roll momentum, Hxc, by firing a roll thruster, that compensates for yaw excursions.

The model 12 of the solar torque feed forward shown in FIG. 1 involves the following considerations and relationships:

Requires updating once per minute:

$\theta = (TSEC + Tmid)*2*\pi*\omega$;

Roll Torque = $C_R + A_{1R} \cos(\theta) + A_{2R} \cos(2\theta \pi/2)$; and

Yaw Torque = $C_Y + B_{1Y} \cos(\theta - \pi/2) + B_{2Y} \cos(2\theta - \pi/2)$;

Requires updating ≈once per week:

Upload $C_R$, $A_{1R}$, $A_{2R}$, $C_H$, $B_{1Y}$, $B_{2Y}$ and Tmid;

Tmid is the time from midnight that TSEC was initialized; and $\omega = 1/24/3600$ If the coefficients are in micro-torques, they can be converted to changes in momentum by appropriately dividing them, for example, by 16,000,000 if the CPU cycle is 16 Hertz.

Figure 3:
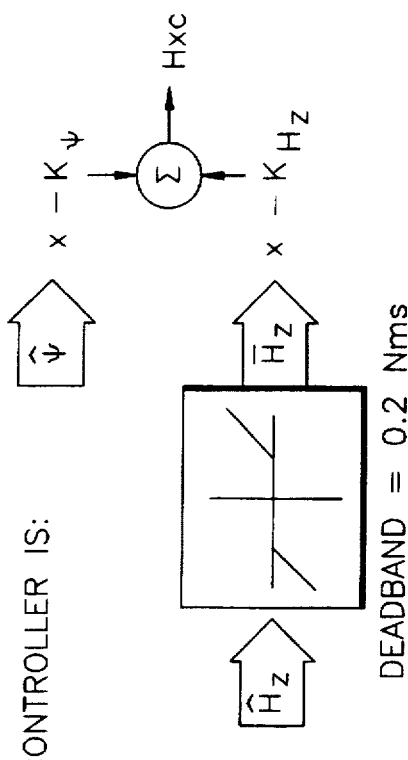
FIG. 3 illustrates the operating model for the Controller component shown in FIG. 1.

FIG. 2 illustrates the operating matrix model for the Observer component 10 shown in FIG. 1, and FIG. 3 illustrates the operating model for the Controller component 14 shown in FIG. 1 for a spacecraft with a deadband=0.2 Nms, although this deadband parameter may typically range between 0.05 and 2.0 depending on the craft.

The definitions of the terms and variables in the models shown in the respective Figures are contained in the following table, TABLE I.

TABLE I

| Variable | Units | Definition |
|---|---|---|
| | | Basic Topology (FIG. 1) |
| $\vec{H}_x$ | Nms | Roll momentum increase from solar torques or thruster firings |
| $\vec{H}_z$ | Nms | Yaw momentum increase from solar torques or thruster firings |
| $\Phi$ | rad | Unbiased roll error from the Earth Sensor (ES) |
| $\Psi$ rate | rad/sec | Yaw rate from the DIRA |
| hz command | Nms | Commanded hz output from the wheel controller |
| hz | Nms | Yaw momentum measured from the wheel speeds |
| $\hat{\psi}$ | rad | Yaw estimate from the observer |
| $\hat{H}_z$ | Nms | Yaw momentum estimate from the observer |
| Hxc | Nms | Commanded change in Roll momentum from the controller Observer (FIG. 2) |
| $\Phi$ | rad | Roll estimate |
| $\psi$ | rad | Yaw estimate |
| $\hat{H}_x$ | Nms | Roll momentum estimate |

TABLE I-continued

| Variable | Units | Definition |
|---|---|---|
| $\hat{H}_z$ | Nms | Yaw momentum estimate |
| $\hat{h}_z$ | Nms | Yaw momentum estimate from the wheels |
| $\Delta\hat{h}_{zc}$ | Nms | Estimate of wheel yaw momentum command offset |
| $\dot{\psi}_{bias}$ | rad/sec | Estimate of DIRA Yaw rate drift |
| $\omega_0$ | rad/sec | Sidereal orbit rate (~7.292169741358633E-5) |
| $I_x$ | Kg-m² | Spacecraft Roll Inertia |
| $I_y$ | Kg-m² | Spacecraft Pitch Inertia |
| $I_z$ | Kg-m² | Spacecraft Yaw Inertia |
| $h_n$ | Nms | Nominal Pitch momentum bias from the wheel speeds |
| $\tau$ | sec | Wheel torque tire constant |
| $\Phi ES$ | rad | Unbiased roll error from the Earth Sensor |
| $h_{ztach}$ | Nms | Yaw momentum measured from the wheel speeds |
| $\Psi DIRA$ | rad/sec | Yaw rate from the DIRA |
| hzc | Nms | Commanded hz output from the wheel controller |
| L | various | Reduced set of optimal steady state Kalman gains Controller (FIG. 3) |
| $\Psi$ | rad | Yaw estimate from the observer |
| $\hat{H}_z$ | Nms | Yaw momentum estimate from the observer |
| $\hat{H}_z$ | Nms | Deadband Yaw Momentum Estimate |
| $K_\psi$ | Nms/rad | Minimum Yaw error and Roll thrust Yaw controller gain |
| $K_{Hz}$ | Nms/Nms | Minimum Yaw error and Roll thrust Yaw momentum controller gain |
| Hxc | Nms | Commanded change in Roll momentum |

Performance Analysis

By way of testing and verifying the improved and satisfactory operation of the TLTMM system of the invention, a performance analysis was conducted. Two cases without the TLTMM system were run as comparisons with four cases using the yaw control of the invention. This testing verified the efficacy of the design and established pointing performance for yaw estimation and control. All cases used an unload of 0.1 Nms which is approximately equivalent to an 8 ms firing. The solar torque feed forward terms (from solar torque model 12) contribute errors up to 10 micro-Newton-meters to the Observer 10. Summer solstice torques were chosen because they impart the largest disturbances to the spacecraft. The estimated fuel usage is based on 0.0015 Kg/Nms for Roll unloads and 0.003 Kg/Nms for Yaw unloads. These can be rescaled to specific thrusters. A cosine fuel consumption was assumed over the year based on the solar torques. The test results are set forth in the following table, TABLE II.

TABLE II

| Case | 3 Roll ES Noise | Noise Gain | Unload Limit (Nms) | Yaw Control Error | Yaw Estimate Error | Roll Unloads (Nms/Day) | Yaw Unloads (Nms/Day) | Estimated Fuel Usage (kg/Year) |
|---|---|---|---|---|---|---|---|---|
| L | | | | 0.40 | 0.40 | | 1.14 | 0.88 |
| V | | | | 0.24 | 0.24 | | 1.10 | 0.85 |
| LN | 0.110 | 1.0 | 0.10 | 0.22 | 0.13 | 0.82 | 0.42 | 0.64 |
| LL | 0.045 | 1.8 | 0.10 | 0.22 | 0.13 | 0.88 | 0.41 | 0.66 |
| VN | 0.110 | 1.0 | 0.12 | 0.15 | 0.09 | 0.63 | 0.66 | 0.75 |
| VL | 0.045 | 1.8 | 0.12 | 0.14 | 0.08 | 0.67 | 0.53 | 0.67 |

It will accordingly be seen that a TLTMM system has been disclosed that keeps yaw under control without magnetic torquers or yaw sensors, but, during periods when yaw sensing is available, it can take advantage of it. The system, to obtain yaw information, utilizes combined data obtained from the roll earth sensor, the wheel tachometer, commanded wheel momentum, roll thruster firings, yaw thruster firings, and, as suggested, yaw rates from the DIRA when available. Using controller gains combined with the observer estimates of yaw and deadband spacecraft yaw momentum, derived from the combined data, roll thruster firings are commanded to control yaw attitude.

What is claimed is:

1. Apparatus for controlling yaw excursions in a spacecraft having on-board components including a roll thruster, momentum wheels, a wheel controller, an earth sensor, and a DIRA, comprising:

observer means, on said spacecraft, for receiving inputs indicative of roll and yaw momentum increases, and inputs containing information comprising the unbiased roll error from the earth sensor, yaw momentum measured from the wheel speeds, and commanded yaw momentum output from the wheel controller, and for producing therefrom output signals indicative of yaw estimate and yaw momentum estimate; and controller means, on said spacecraft, for receiving said output signals and combining them with inputs containing information comprising mimimum yaw error and roll thrust yaw controller gain and miminmum yaw error and roll thrust yaw momentum controller gain, and for producing therefrom a signal for commanding the firing of said roll thruster to change roll momentum, whereby the yaw attitude and yaw excursions are controlled.

2. Apparatus as in claim 1 wherein said observer means further comprises means for receiving an input containing information indicative of yaw rate from the DIRA.

3. Apparatus as in claim 1 further comprising means for providing said inputs indicative of roll and yaw momentum increases to said observer means, wherein said inputs are indicative of roll and yaw momentum increases due to solar torques or thruster firings.

4. Apparatus as in claim 1 wherein said observer means comprises matrix means for providing said output signals comprising:

$$\begin{bmatrix} \dot{\Phi} \\ \dot{\Psi} \\ \dot{H}_x \\ \dot{H}_z \\ \dot{h}_z \\ \Delta \dot{h}_{zc} \\ \dot{\Psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \Phi \\ \Psi \\ H_x \\ H_z \\ h_z \\ \Delta h_{zc} \\ \Psi_{bias} \end{bmatrix} +$$

$$[L] \begin{bmatrix} \Phi_{ES} - \Phi \\ h_{z_{tach}} - h_z \\ \Psi_{DIRA} - \Psi_{bias} - \Psi \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

wherein:

$$g_x = -3\omega_0^2(I_y - I_z); \; \Gamma_x = \frac{h_n + \omega_0(I_y - I_x)}{I_x} \; ;$$

$$\Gamma_z = -\frac{h_n + \omega_0(I_y - I_x)}{I_z} \; ; \; \Psi = \frac{H_z}{I_z} - \omega_0\Phi; \; T_x = 16 H_x; T_z = 16 H_z$$

$$L = \begin{bmatrix} L_{11} & 0 & 0 \\ L_{21} & 0 & L_{23} \\ L_{31} & 0 & L_{33} \\ L_{41} & 0 & L_{43} \; L_{73} \\ \times & 0 & L_{52} \\ 0 & 0 & L_{62} \\ 0 & L_{71} & 0 \end{bmatrix} \; ; \text{ and}$$

| Variable | Units | Definition |
|---|---|---|
| $\Phi$ | rad | Roll estimate |
| $\Psi$ | rad | Yaw estimate |
| $\hat{H}_x$ | Nms | Roll momentum estimate |
| $\hat{H}_z$ | Nms | Yaw momentum estimate |
| $h_z$ | Nms | Yaw momentum estimate from the wheels |
| $\Delta h_{zc}$ | Nms | Estimate of wheel yaw momentum command offset |
| $\Psi_{bais}$ | rad/sec | Estimate of DIRA Yaw rate drift |
| $\omega_0$ | rad/sec | Sidereal orbit rate (~7.292169741358633E-5) |
| $I_x$ | Kg-m² | Spacecraft Roll Inertia |
| $I_y$ | Kg-m² | Spacecraft Pitch Inertia |
| $I_z$ | Kg-m² | Spacecraft Yaw Inertia |
| $h_n$ | Nms | Nominal Pitch momentum bias from the wheel speeds |
| $\tau$ | sec | Wheel torque time constant |
| $\Phi ES$ | rad | Unbiased roll error from the Earth Sensor |
| $h_{ztach}$ | Nms | Yaw momentum measured from the wheel speeds |
| $\Psi_{DIRA}$ | rad/sec | Yaw rate from the DIRA |
| hzc | Nms | Commanded hz ouptut from the wheel controller |
| L | various | Reduced set of optimal steady state Kalman gains |

5. Apparatus as in claim 1 wherein said controller means comprises deadband means for receiving said yaw momentum estimate output signal and having a value in the range from 0.05 to 2 Nms.

6. A method for controlling yaw excursions in spacecraft having on-board components including a roll thruster, momentum wheels, a wheel controller, an earth sensor, and a DIRA, comprising the steps of:

deriving first input signals indicative of roll and yaw momentum increases;

receiving second input signals containing information comprising the unbiased roll error from the earth sensor, yaw momentum measured from the wheel speeds, and commanded yaw momentum output from the wheel controller;

combining said first and second input signals and producing therefrom output signals indicative of yaw estimate and yaw momentum estimate; and combining said output signals with a mimimum yaw error and roll thrust yaw controller gain and a miminmum yaw error and roll thrust yaw momentum controller gain, and producing therefrom a signal for commanding firings of said roll thruster to change roll momentum, whereby yaw attitude and yaw excursions are controlled.

7. A method as in claim 6 wherein said second input signals further comprise a signal containing information indicative of yaw rate from the DIRA.

8. A method as in claim 6 wherein said first input signals comprise information indicative of roll and yaw momentum increases due to solar torques or thruster firings.

9. Apparatus as in claim 4 wherein said controller means comprises:

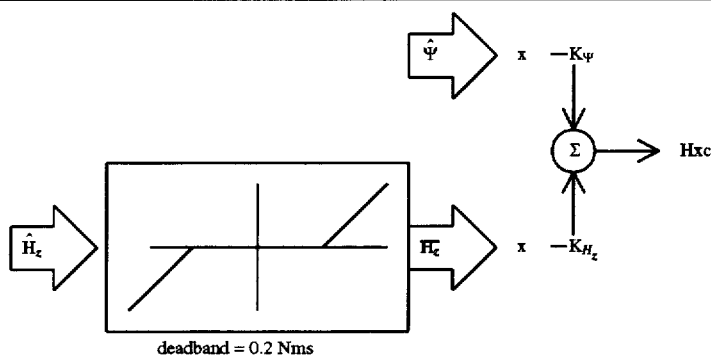

wherein:

| Variable | Units | Definition |
|---|---|---|
| $\Psi$ | rad | Yaw estimate from the observer |
| $\hat{H}_Z$ | Nms | Yaw momentum estimate from the observer |
| $H_Z$ | Nms | Deadband Yaw Momentum Estimate |
| $K_\psi$ | Nms/rad | Minimum Yaw error and Roll thrust Yaw controller gain |
| $K_{HZ}$ | Nms/Nms | Minimum Yaw error and Roll thrust Yaw momentum controller gain |
| Hxc | Nms | Commanded change in Roll momentum |

10. A method as in claim 6 wherein said step of combining said output signals with a mimimum yaw error and roll thrust yaw controller gain and a miminmum yaw error and roll thrust yaw momentum controller gain, comprises converting said yaw momentum estimate to the deadband estimate of spacecraft yaw momentum before combining it with said minimum yaw error and roll thrust yaw momentum controller gain.

11. A method as in claim 10 wherein the deadband has a value in the range between 0.05 and 2 Nms.

12. A system for controlling yaw excursions in a spacecraft having on-board components including a roll thruster, momentum wheels, a wheel controller, an earth sensor, and a DIRA, comprising:

means, on said spacecraft, for producing input signals indicative of roll and yaw momentum increases due to solar torques or thruster firings;

observer means, on said spacecraft, for receiving said input signals indicative of roll and yaw momentum increases, and inputs containing information comprising the unbiased roll error from the earth sensor, yaw momentum measured from the wheel speeds, and commanded yaw momentum output from the wheel controller, and for producing therefrom output signals indicative of the yaw estimate and the yaw momentum estimate; and controller means, on said spacecraft, for receiving said output signals and combining said yaw estimate output signal with a signal indicative of mimimum yaw error and roll thrust yaw controller gain and combining said yaw momentum estimate output signal after deadbanding with a signal indicative of minimum yaw error and roll thrust yaw momentum controller gain, and for producing from a combination of said combinings a signal for commanding the firing of said roll thruster to change roll momentum, whereby the yaw attitude and yaw excursions are controlled.

13. A method as in claim 6 wherein said first and second input signals are combined in accordance with the matrix comprising:

$$\begin{bmatrix} \dot{\Phi} \\ \dot{\Psi} \\ \dot{H}_x \\ \dot{H}_z \\ \dot{h}_z \\ \Delta \dot{h}_{zc} \\ \dot{\Psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \Phi \\ \Psi \\ H_x \\ H_z \\ h_z \\ \Delta h_{zc} \\ \Psi_{bias} \end{bmatrix} +$$

$$[L] \begin{bmatrix} \Phi_{ES} - \Phi \\ h_{tach} - h_z \\ \Psi_{DIRA} - \Psi_{bias} - \Psi \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

wherein:

$g_x = -3\omega_0^2(I_y - I_z); \Gamma_x = \dfrac{h_n + \omega_0(I_y - I_x)}{I_x}$ ;

$\Gamma_z = -\dfrac{h_n + \omega_0(I_y - I_x)}{I_z}$ ; $\Psi = \dfrac{H_z}{I_z} - \omega_0 \Phi$; $T_x = 16H_x$, $T_z = 16H_z$ $$L = \begin{bmatrix} L_{11} & 0 & 0 \\ L_{21} & 0 & L_{23} \\ L_{31} & 0 & L_{33} \\ L_{41} & 0 & L_{43} \; L_{73} \\ \times & 0 & L_{52} \\ 0 & 0 & L_{62} \\ 0 & L_{71} & 0 \end{bmatrix}$$ ; and

| Variable | Units | Definition |
|---|---|---|
| $\Phi$ | rad | Roll estimate |
| $\Psi$ | rad | Yaw estimate |
| $\hat{H}_x$ | Nms | Roll momentum estimate |
| $\hat{H}_z$ | Nms | Yaw momentum estimate |
| $h_z$ | Nms | Yaw momentum estimate from the wheels |
| $\Delta h_{zc}$ | Nms | Estimate of wheel yaw momentum command offset |
| $\Psi_{bais}$ | rad/sec | Estimate of DIRA Yaw rate drift |
| $\omega_0$ | rad/sec | Sidereal orbit rate (~7.292169741358633E-5) |
| $I_x$ | Kg-m² | Spacecraft Roll Inertia |
| $I_y$ | Kg-m² | Spacecraft Pitch Inertia |
| $I_z$ | Kg-m² | Spacecraft Yaw Inertia |
| $h_n$ | Nms | Nominal Pitch momentum bias from the wheel speeds |
| $\tau$ | sec | Wheel torque time constant |
| $\Phi_{ES}$ | rad | Unbiased roll error from the Earth Sensor |
| $h_{ztach}$ | Nms | Yaw momentum measured from the wheel speeds |
| $\Psi_{DIRA}$ | rad/sec | Yaw rate from the DIRA |
| hzc | Nms | Commanded hz ouptut from the wheel controller |
| L | various | Reduced set of optimal steady state Kalman gains |

14. A system as in claim 12 wherein said controller means comprises deadband means for receiving said yaw momentum estimate output signal and setting the deadband at a value in the range between 0.05 and 2 Nms.

15. A method as in claim 13 wherein said step of combining said output signals with a mimimum yaw error and roll thrust yaw controller gain and a miminmum yaw error and roll thrust yaw momentum controller gain, and producing therefrom a signal for commanding firings of said roll thruster to change roll momentum, comprises:

16. A system as in claim 12 wherein said observer means comprises matrix means for providing said output signals, said matrix comprising:

$$\begin{bmatrix} \dot{\Phi} \\ \dot{\Psi} \\ \dot{H}_x \\ \dot{H}_z \\ \dot{h}_z \\ \Delta \dot{h}_{zc} \\ \dot{\Psi}_{bias} \end{bmatrix} = \begin{bmatrix} 0 & \omega_0 & \frac{1}{I_x} & 0 & 0 & 0 & 0 \\ -\omega_0 & 0 & 0 & \frac{1}{I_z} & 0 & 0 & 0 \\ g_x & 0 & 0 & \Gamma_z & \omega_0 & 0 & 0 \\ 0 & 0 & \Gamma_x & 0 & \frac{1}{\tau} & \frac{1}{\tau} & 0 \\ 0 & 0 & 0 & 0 & -\frac{1}{\tau} & -\frac{1}{\tau} & 0 \\ 0 & 0 & 0 & 0 & 0 & 0 & 0 \\ 0 & 0 & 0 & 0 & 0 & 0 & 0 \end{bmatrix} \begin{bmatrix} \Phi \\ \Psi \\ H_x \\ H_z \\ h_z \\ \Delta h_{zc} \\ \Psi_{bias} \end{bmatrix} +$$

$$[L] \begin{bmatrix} \Phi_{ES} - \Phi \\ h_{ztach} - h_z \\ \Psi_{DIRA} - \Psi_{bias} - \Psi \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \\ 0 & 0 & 0 \\ 0 & 0 & 0 \end{bmatrix} \begin{bmatrix} T_x \\ T_z \\ h_{zc} \end{bmatrix}$$

wherein:

$$g_x = -3\omega_0^2(I_y - I_z); \; \Gamma_x = \frac{h_n + \omega_0(I_y - I_x)}{I_x} \; ;$$

$$\Gamma_z = -\frac{h_n + \omega_0(I_y - I_x)}{I_z} \; ; \; \Psi = \frac{H_z}{I_z} - \omega_0\Phi; \; T_x = 16H_x, T_z = 16H_z$$

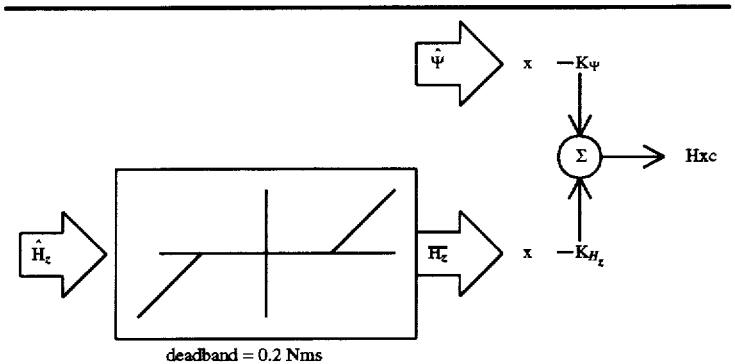

wherein:

| Variable | Units | Definition |
|---|---|---|
| $\hat{\Psi}$ | rad | Yaw estimate from the observer |
| $\hat{H}_z$ | Nms | Yaw momentum estimate from the observer |
| $H_z$ | Nms | Deadband Yaw Momentum Estimate |
| $K_\Psi$ | Nms/rad | Minimum Yaw error and Roll thrust Yaw controller gain |
| $K_{Hz}$ | Nms/Nms | Minimum Yaw error and Roll thrust Yaw momentum controller gain |
| Hxc | Nms | Commanded change in Roll momentum |

-continued $$L = \begin{bmatrix} L_{11} & 0 & 0 \\ L_{21} & 0 & L_{23} \\ L_{31} & 0 & L_{33} \\ L_{41} & 0 & L_{43} & L_{73} \\ \times & 0 & L_{52} \\ 0 & 0 & L_{62} \\ 0 & L_{71} & 0 \end{bmatrix} \text{ and };$$

| Variable | Units | Definition |
|---|---|---|
| $\Phi$ | rad | Roll estimate |
| $\hat{\Psi}$ | rad | Yaw estimate |
| $\hat{H}_x$ | Nms | Roll momentum estimate |
| $\hat{H}_z$ | Nms | Yaw momentum estimate |
| $\hat{h}_z$ | Nms | Yaw momentum estimate from the wheels |
| $\Delta h_{zc}$ | Nms | Estimate of wheel yaw momentum command offset |
| $\hat{\Psi}_{bias}$ | rad/sec | Estimate of DIRA Yaw rate drift |
| $\omega_0$ | rad/sec | Sidereal orbit rate (~7.292169741358633E-5) |
| $I_x$ | Kg-m² | Spacecraft Roll Inertia |
| $I_y$ | Kg-m² | Spacecraft Pitch Inertia |
| $I_z$ | Kg-m² | Spacecraft Yaw Inertia |
| $h_n$ | Nms | Nominal Pitch momentum bias from the wheel speeds |
| $\tau$ | sec | Wheel torque time constant |
| $\Phi ES$ | rad | Unbiased roll error from the Earth Sensor |
| $h_{ztach}$ | Nms | Yaw momentum measured from the wheel speeds |
| $\Psi_{DIRA}$ | rad/sec | Yaw rate from the DIRA |
| hzc | Nms | Commanded hz ouptut from the wheel controller |
| L | various | Reduced set of optimal steady state Kalman gains |

17. Apparatus as in claim 16 wherein said controller means comprises:

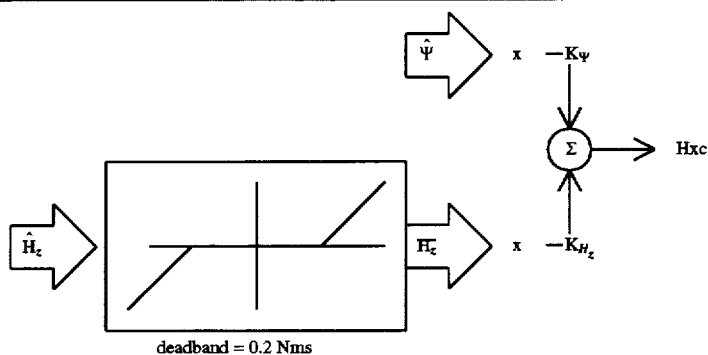

deadband = 0.2 Nms wherein:

| Variable | Units | Definition |
|---|---|---|
| $\hat{\Psi}$ | rad | Yaw estimate from the observer |
| $\hat{H}_Z$ | Nms | Yaw momentum estimate from the observer |
| $H_Z$ | Nms | Deadband Yaw Momentum Estimate |
| $K_\psi$ | Nms/rad | Minimum Yaw error and Roll thrust Yaw controller gain |
| $K_{HZ}$ | Nms/Nms | Minimum Yaw error and Roll thrust Yaw momentum controller gain |
| Hxc | Nms | Commanded change in Roll momentum |

\* \* \* \* \*